E. P. NICHOLS.
BICYCLE BELL.
APPLICATION FILED OCT. 7, 1912.
1,064,525.
Patented June 10, 1913.
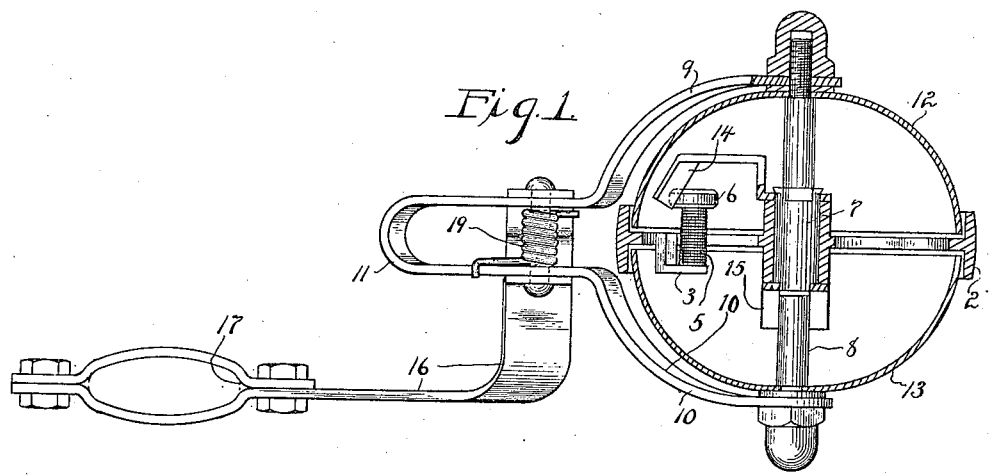
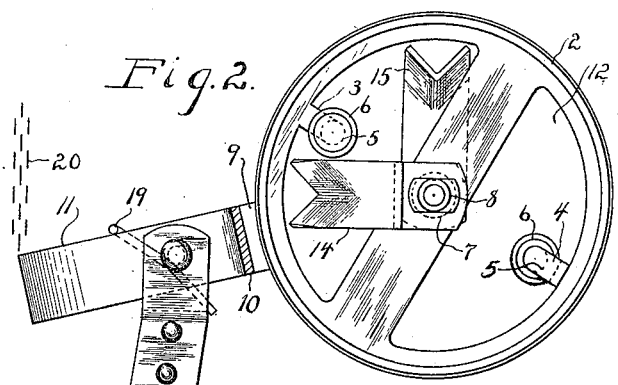
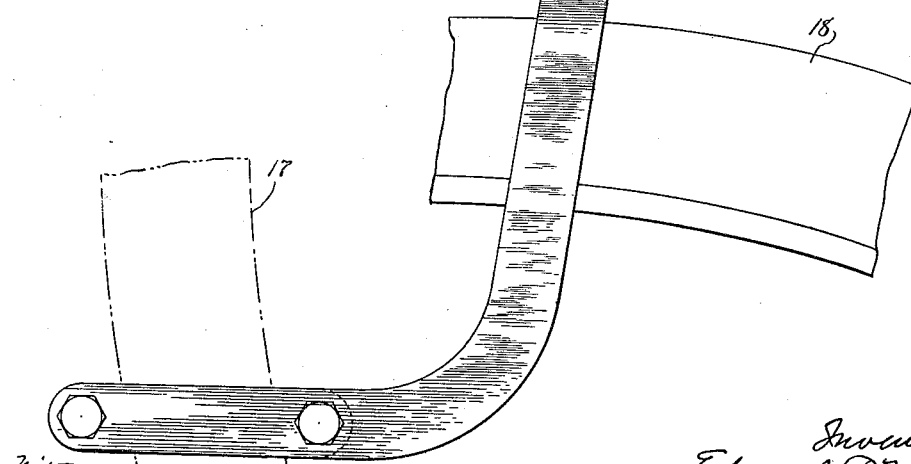
Inventor
Edward P. Nichols

UNITED STATES PATENT OFFICE.

EDWARD P. NICHOLS, OF EAST HAMPTON, CONNECTICUT, ASSIGNOR TO THE STARR BROS. BELL CO., OF EAST HAMPTON, CONNECTICUT, A CORPORATION.

BICYCLE-BELL.

1,064,525.   Specification of Letters Patent.   Patented June 10, 1913.

Application filed October 7, 1912. Serial No. 724,407.

*To all whom it may concern:*

Be it known that I, EDWARD P. NICHOLS, a citizen of the United States, residing at East Hampton, in the county of Middlesex and State of Connecticut, have invented a new and useful Improvement in Bicycle-Bells; and I do hereby declare the following, when taken in connection with the accompanying drawings and the characters of reference marked thereon, to be a full, clear, and exact description of the same, and which said drawings constitute part of this application, and represent, in—

Figure 1 a top or plan view, partly in section, of a bicycle bell constructed in accordance with my invention. Fig. 2 a side view with one of the gongs removed.

This invention relates to an improvement in bicycle bells, and particularly bells which are sounded by frictional engagement with the tire of a wheel.

The object of this invention is to provide a construction in which the bells are so arranged as to give a clear ring; and the invention consists in the construction hereinafter described and particularly recited in the claim.

In carrying out my invention, I employ a ring-like frame 2, similar to the frames of double-alarm bells, provided at opposite sides with inwardly projecting arms 3, 4, to which springs 5 are attached, and which springs carry hammer-heads 6 at their outer ends. This frame is mounted to revolve on the central portion 7 of a shaft 8 which is rigidly mounted in the ends 9, 10 of a yoke 11, and fixed to this shaft are gongs 12, 13, the edges of which are somewhat less in diameter than the diameter of the frame 2, so that the frame projects beyond the edges of the gong. Also fixed to the shaft are two trippers 14, 15, the outer ends of which are adapted to engage successively with the hammer-heads 6 so as to draw them inward, and then release them so that as they fly back, they will strike the respective gongs. The yoke 11 is mounted in the upper end of the arm 16, which is clamped to one of the forks 17 of the bicycle frame, the shape of the arm being such as to hold the frame 2 centrally over the tire 18. Between the yoke and the upper end of the arm is a spring 19 the tendency of which is to lift the bells away from the tire against which they may be forced by a chain 20 secured to the inner end of the yoke and extending to any convenient point. When it is desired to sound the alarm, the inner end of the yoke will be raised to move the gongs downward and the frame 2 against the surface of the tire with sufficient friction to cause the frame 2 to be rotated. As the frame turns the hammers successively engage with the trippers and produce a number of rapidly succeeding strokes upon the gongs. As soon as the yoke is released, the spring will lift the frame away from the tire, and the rotation of the frame with respect to the bells will cease.

I claim:—

A bicycle bell comprising a yoke, a shaft fixed in the outer ends of said yoke, a ring-like frame free to rotate on said shaft, said frame carrying two reversely turned hammers, a gong on each end of said shaft, and a tripper within each gong and adapted as the frame is turned to cause the hammers to strike the respective gongs.

In testimony whereof, I have signed this specification in the presence of two subscribing witnesses.

EDWARD P. NICHOLS.

Witnesses:
 JOHN P. LAMB,
 ROSE CAVANAUGH.

Copies of this patent may be obtained for five cents each, by addressing the "Commissioner of Patents, Washington, D. C."